Figure 1:
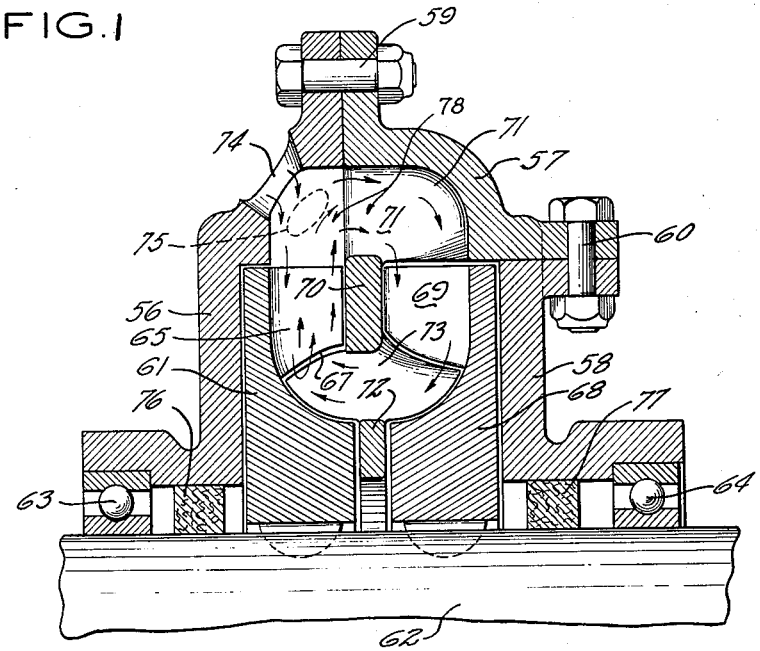

Feb. 2, 1960 A. M. WRIGHT 2,923,246
VORTEX PUMP
Original Filed Oct. 31, 1951

INVENTOR
A. M. WRIGHT
BY
ATTORNEY

United States Patent Office 2,923,246
Patented Feb. 2, 1960

2,923,246

VORTEX PUMP

Alexander M. Wright, West Hartford, Conn., assignor, by mesne assignments, to Chandler-Evans Corporation, West Hartford, Conn., a corporation of Delaware Original application October 31, 1951, Serial No. 254,022, now Patent No. 2,842,062, dated July 8, 1958. Divided and this application May 16, 1958, Serial No. 740,176

4 Claims. (103—96)

This application is a division of my copending application, Serial No. 254,022, filed October 31, 1951, now Patent No. 2,842,062, which pertains to a type of rotary pump having flat, radial impeller blades, integral with the impeller rotor. Such pumps have been used industrially for many years in applications where high head and moderate flow are required and are commonly known as "turbine type" pumps. However, the name "turbine type" is a misnomer, since this term has been generally applied to centrifugal pumps that are fitted with diffuser vanes in the volute casing. Also, in aircraft work, the name "turbine pumps" is rather loosely applied to pumps driven by air turbines. The name "vortex pump" is a more descriptive term for the type of pump to which this invention pertains and will be used in this application.

An analysis of the principles of operation of the vortex pump indicates that it has the following distinct advantages which make it particularly suitable for use as a fuel boost pump for aircraft engines:

(1) Ability to handle considerable quantities of liquid fuel at moderate or high discharge pressures.

(2) High head in a single stage, with small diameter impeller wheel.

(3) Fairly large capacity.

(4) Small over-all size and weight.

(5) Simplicity of construction.

However, vortex pumps heretofore in use have three serious disadvantages which have largely precluded their application to aircraft work, namely:

(1) Rather poor efficiency, as compared with gear, vane and centrifugal pumps.

(2) Limited ability to operate satisfactorily under inlet suction conditions.

(3) High internal pressure and maximum power consumption at discharge shut-off.

From an analysis of the characteristics of the vortex pump, I have found that the above disadvantages stem largely from the toroidal or vortex currents that are set up by the rotation of the impeller in planes at right angles to the plane of said rotation. These vortex currents absorb by internal friction increasing percentages of the pump input power as the speed of the pump impeller increases. Also, at any given impeller speed, the velocity of these vortex currents increases as the discharge of the pump is decreased (by restriction of the discharge passage) until, at zero discharge, the energy loss from vortex circulation is equal to the total pump input power.

If means could be found to reduce the magnitude of the adverse characteristics mentioned above, the advantages of the vortex pump would greatly outweigh its disadvantages, for use as an aircraft engine fuel boost pump.

Accordingly, a primary object of this invention is to provide ways and means whereby the adverse characteristics of prior art vortex pumps, mentioned above, are greatly reduced, without materially affecting the advantages of this type of pump for use as a fuel boost pump.

Another object is to provide an improved vortex pump in which the vortex currents at the entrance to the impeller are materially reduced and the pump efficiency is thereby increased over that of prior art pumps of this type.

A further object is to provide an improved vortex pump having means for utilizing the energy of the toroidal or vortex currents generated by the pumping blades to assist in rotating the pumping impeller, and thereby reduce the input power required to drive the pump, as the speed of the pump impeller increases, or as the discharge rate of the pump is decreased by throttling its outlet passage.

A further object is to provide a vortex pump with greatly improved pressure volume characteristics for use as an aircraft engine fuel pump and particularly as a fuel boost pump.

Figure 2:
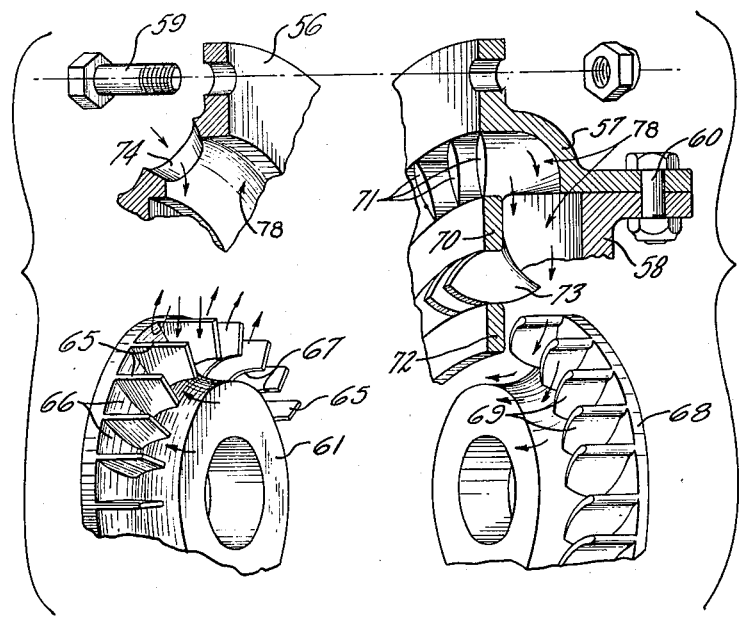

With these and other objects in view which may be incident to my improvements, my invention consists in the combination and arrangement of elements hereinafter described and illustrated in the accompanying drawings, in which:

Fig. 1 is a partial axial section of an improved vortex pump, in accordance with one embodiment of my invention, and Fig. 2 is an exploded view of parts of the pump shown in Fig. 1.

Since the centrifugal force acting on a rotating body increases with the radius from the center of rotation, the fluid pressure in the outer part of the fluid channel beyond the pumping blades of a vortex pump is greater than the fluid pressure in the corresponding inner part of said channel (i.e. adjacent the pumping blades). This difference in fluid pressures causes the fluid to flow in a generally circular path, at right angles to the plane of rotation of the impeller, as indicated by the arrows in Fig. 1. The vortex currents set up by this toroidal circulation absorb (by internal friction) increasing percentages of the input power applied to the pump drive shaft, as the impeller speed increases. Also, at any given impeller speed, the velocity of these vortex currents increases as the discharge of the pump is decreased (by restriction of the discharge outlet) until, at zero pump discharge, the energy loss from vortex circulation is equal to the total pump input power. Since the gain in pressure from the root to tip of each pumping blade, due to centrifugal force, equals the loss in pressure, due to friction against the stationary walls of the pumping passage, the resulting vortex circulation adds nothing to the discharge pressure of the pump and thus constitutes a net loss in pump efficiency. It is thus obvious that if this energy dissipation could be avoided, the efficiency of the vortex pump would be correspondingly improved.

In addition to the foregoing loss of efficiency, there is also a further loss of efficiency in a conventional vortex pump, due to the friction and turbulence caused by the churning of the fluid in the inlet fluid passage of the pump from the cutting of the pumping impeller blades through the column of fluid in said passage.

In order to reduce the above mentioned losses in efficiency to a minimum, I have devised the improved form of vortex pump illustrated in my aforesaid copending parent application, and to further reduce the loss of energy and to improve the efficiency of the vortex type pump, I have devised the embodiment of my invention which is illustrated in Figs. 1 and 2. Here the pump housing comprises three matching parts 56, 57 and 58 which are provided internally with contoured grooves that define an annular fluid passage 78, when said parts are assembled together, as shown in Fig. 1. Parts 56, 57 and 58 are secured in assembled position by two series of flange bolts 59 and 60, that hold said parts in fixed space relation to an inclosed impeller 61 which is mounted upon and keyed to a drive shaft 62, supported by ball bearings 63 and 64 in housings 56 and 58. Impeller 61 is provided with a series of flat, radial blades 65 which define an equal series of buckets 66 and have their inner edges undercut with contoured notches 67, as clearly shown in the lower left-hand part of Fig. 2.

Mounted upon and keyed to shaft 62 is a turbine rotor 68 having a series of curved blades 69 of approximately the same area as blades 65. Attached to housing 57 is a central web member comprising an outer ring 70, carrying a series of contoured stator guide vanes 71 and an inner ring 72, carrying a second series of contoured stator guide vanes 73, which are shaped and arranged to complement impeller blades 65 and turbine blades 69. Housing 56 is provided with a fluid inlet 74 and a similarly disposed outlet 75, arrange peripherally with reference to each other in substantially the same manner as inlet 3 and outlet 4 of a conventional vortex pump. The housing 56, 57 has an inwardly extending baffle wall, located between inlet 74 and outlet 75, and surrounding impeller blades 65 and turbine blades 69 with a minimum clearance, which serves as a cutwater. It will be understood that when the pump is assembled as shown in Fig. 1, the adjacent surfaces of impeller blades 65, turbine blades 69 and stationary guide vanes 71 and 73, all fit together with the minimum clearance to insure a free running of the impeller 61 and turbine rotor 68. Shaft seals 76 and 77 prevent the leakage of fluid from housing 56, 58 during operation of the pump.

With the arrangement of parts as just described and shown in Figs. 1 and 2, fluid entering inlet 74 flows into channel 78 and thence moves with a general vortex or toroidal motion through vanes 71, blades 69 and vanes 73, being at the same time carried in a peripheral direction towards the discharge outlet 75. Also, as in the conventional vortex pump, the fluid entering buckets 66 is rotated by the impeller 61 which throws the fluid in passage 78 toward the outer wall of housing 56 with an increasing pressure, from inlet 74 to outlet 75, owing to the centrifugal force imparted by the rotation of the impeller. When the fluid reaches the region of outlet 75, the tangential component of its angular velocity is reduced by the cutwater to zero, or to a small value, depending upon the degree of opening of the pump discharge outlet and the consequent rate of discharge. During rotation of impeller 61 a portion of the fluid in passage 78 flows through stationary guide vanes 71, and from thence, through turbine blades 69 and stationary vanes 73, back to the inner periphery of buckets 66. This flow through guide vanes 71, turbine blades 69, and guide vanes 73 sets up a toroidal or vortex circulation of fluid in passage 78 in planes at right angles to the planes of rotation of impeller 61 and turbine rotor 68, as indicated by the arrows in Fig. 1. While the fluid leaving the tips of pump blades 65 in the region of outlet 75 has its tangential component of velocity reduced by the cutwater to zero (or a small value dependent upon the rate of discharge of the pump), its toroidal or vortex component of velocity remains unimpeded. The fluid in its vortex motion, being directed by stationary vanes 71 into turbine blades 69, imparts a rotation to the turbine rotor 68 in the conventional manner. The energy thus imparted to turbine rotor 68 is transmitted to shaft 62 where it assists in driving pump impeller 61. Accordingly, the energy of the toroidal or vortex circulation of fluid in the pump shown in Figs. 1 and 2 does useful work in helping to drive the pump impeller, instead of being absorbed by friction losses, as in the conventional type of turbine pump.

In my novel pump as shown in Figs. 1 and 2, the walls of passage 78 and the surfaces of vanes 71, 69 and 73 are made very smooth and of streamlined form so as to minimize the loss of energy due to friction in the toroidal circulation of fluid therein. Hence, the velocity of circulation in the toroidal channel is limited not by friction, but by extracting useful work from the fluid so circulating. By a proper choice of angles and contours of the stationary guide vanes 71 and 73 and the rotating turbine blades 69, nearly all of the energy of the toroidal or vortex circulation of fluid in passage 78 can be extracted and applied to the rotation of the pump drive shaft 62, thus greatly reducing the amount of external power required to drive the pump impeller 61 and correspondingly increasing the overall efficiency of the pump.

Since the amount of toroidal or vortex circulation in the pump shown in Figs. 1 and 2, decreases as the rate of pump discharge increases, the more the rate of discharge is reduced by restricting the outlet passage, the greater the percentage of fluid entering into toroidal circulation and the greater the percentage of energy imparted to drive shaft 62 by the toroidal circulation. Hence, unlike the conventional vortex pump, there is no material increase in input energy absorption due to fluid turbulence and friction, when the rate of discharge of the pump of Figs. 1 and 2 is decreased by restricting the discharge outlet. On the contrary, the more the outlet of my novel pump is restricted the less the input energy required to operate the pump.

From what has been shown above, it is clear that in the form vortex pump illustrated in Figs. 1 and 2, the toroidal or vortex circulation of fluid in the passage 78 results in a relatively small dissipation of energy due to friction, and the velocity of this circulation is limited primarily by the extraction of useful work in the turbine element. This pump, therefore, retains the advantages of the conventional vortex pump mentioned in column 1 above, particularly the development of high pressure in a single element, and at the same time yields overall efficiencies comparable with those of centrifugal pumps.

While I have shown and described the preferred embodiments of my invention, I desire it to be understood that I do not limit myself to the precise details of construction and arrangement of elements, as these may be changed and modified by those skilled in the art without departing from the spirit of my invention or exceeding the scope of the appended claims.

I claim:

1. A rotary pump comprising: a housing having an annular fluid passage of substantially circular cross-section from its inlet to its outlet, a pump impeller and a turbine rotor fixed to a common shaft for rotation therewith in said passage, said shaft being journalled in said housing said impeller having fixed blades circumferentially traversing the inner portion of said passage on one side of its central radial plane; said turbine rotor having arcuate blades circumferentially traversing the inner portion of said passage on the opposite side of its central radial plane; said housing having a first series of curved, stationary guide vanes extending into said passage and arranged to guide fluid discharged from said impeller into said turbine blades, and a second series of curved stationary guide vanes extending into said passage and arranged to guide fluid discharged from said turbine rotor back to said impeller; thereby materially reducing the loss of energy from toroidal circulation of fluid in said passage by applying said energy to the rotation of said pump impeller through said turbine rotor and common shaft; whereby the efficiency of said pump is substantially increased.

2. A rotary pump according to claim 1, having means for introducing vortex circulating fluid into said impeller only at the root zone of said impeller blades, thereby materially reducing vortex currents in the region of entrance into said impeller and correspondingly increasing the efficiency of said pump.

3. A rotary pump according to claim 1, wherein said impeller blades are provided with undercut notches defining a circular recess in the inner lateral face of said impeller, and said second stationary guide vanes have lateral extensions which fit into said recess, so that fluid flowing through said second guide vanes enters said impeller blades within the root zone thereof; thereby materially reducing vortex currents in said second guide vanes adjacent to the entrance into said impeller, and correspondingly increasing the efficiency of said pump.

4. A rotary pump comprising: a housing having an annular fluid passage, an impeller mounted for rotation in said housing and having integral radial blades which circumferentially traverse only the inner portion of said passage; said housing having stationary guide vanes in said passage to reduce the turbulence of fluid flowing downstream of said vanes; means in said passage for introducing fluid laterally into said impeller only in the root zone of said blades, means for discharging said fluid radially from said impeller; whereby vortex currents in said passage are materially reduced; and means for applying energy from the vortex circulation of fluid in said passage to the rotation of said impeller; whereby the efficiency of said pump is substantially increased.

References Cited in the file of this patent

UNITED STATES PATENTS

| 748,689 | Benjamin | Jan. 5, 1904 |
| 2,381,682 | Mayner | Aug. 7, 1945 |

FOREIGN PATENTS

| 581,808 | Germany | Aug. 3, 1933 |